March 12, 1968   G. PETERSON ET AL   3,373,291
MEANS FOR PROTECTING TRANSISTORS FROM HIGH VOLTAGE PULSES
Filed Aug. 21, 1961                                3 Sheets-Sheet 1

INVENTOR.
GLEN PETERSON
HUBERT A. BURNS

March 12, 1968   G. PETERSON ET AL   3,373,291
MEANS FOR PROTECTING TRANSISTORS FROM HIGH VOLTAGE PULSES
Filed Aug. 21, 1961   3 Sheets-Sheet 3

INVENTOR.
GLEN PETERSON
HUBERT A. BURNS

United States Patent Office 3,373,291
Patented Mar. 12, 1968

3,373,291
MEANS FOR PROTECTING TRANSISTORS FROM HIGH VOLTAGE PULSES
Glen Peterson, 540 S. 83rd E. Ave. 74112, and Hubert A. Burns, 7925 E. 27th Court 74129, both of Tulsa, Okla.
Filed Aug. 21, 1961, Ser. No. 132,957
16 Claims. (Cl. 307—202)

This invention relates to protective devices for transistors. It particularly pertains to simplified and improved apparatus for protecting transistors from transient voltage pulses which momentarily exceed the transistor ratings.

Unlike vacuum tubes, transistors cannot withstand voltage transients which greatly exceed their operating ratings, even though these transients may last for only a small fraction of a second. When voltage "spikes," which greatly exceed rated values, hit a transistor the internal solid state semi-insulating barriers are broken down and the transistor is thereafter usually worthless. Moreover, since all transistors in use have D.C. potentials applied to them continuously, a momentary voltage surge which is sufficient to break down the potential barrier between electrodes in a transistor may result in large currents from the energizing D.C. source which completely burn the transistor up in a short length of time, and with it perhaps other circuit components.

The source of such voltage surges is often through switching operations either within, or external to, the circuit in which a particular transistor is used. The internally generated voltage "spikes" of course reach the transistors of a particular circuit via the connections which with the transistors and other circuit components form the circuit. The externally generated voltage "spikes" usually reach the transistors through common power busses. Occasionally, excessive voltages are picked up inductively or through electrostatic coupling. In any event, excessive voltages on any pair of transistor electrodes, however derived, usually mean "sudden death" to the transistor.

Several remedies for this problem are presently in use, such as: (1) using transistors which have voltage ratings greatly in excess of the circuit requirements; (2) protecting the transistor by means of diodes connected directly across the transistor electrodes; (3) use of complicated regulating circuits employing one or more additional transistors, diodes and other circuit components.

The first of the above remedies is both expensive and not altogether certain. Since the price of transistors increase rapidly with voltage ratings, it is unnecessarily expensive to have to use over-rated transistors in any circuit. Transistors are devices which will last almost indefinitely when kept within their ratings, but they will not usually last even a few milliseconds when the ratings are greatly exceeded. Accordingly, to be obliged to use sixty-dollar transistors, for example, in a circuit where six-dollar units, for example, are more than satisfactory as far as circuit requirements are concerned, simply because a high voltage spike might occasionally hit the circuit, is not economical. Moreover, the sixty-dollar transistor may only stand 60 volts, the circuit requirement being 12 volts, whereas transient voltage surges of several hundred volts are often encountered in practical applications. Thus, the sixty-dollar transistor is not a sure thing in any event, and several-hundred volt transistors do not exist, or are likely to be produced.

The second remedy, the use of protecting diodes, works in some applications but not in others. Generally speaking, a diode which has the capability of protecting a transistor will have a considerably longer time constant than the transistor being protected. Consequently, a transistor in many applications will have long "been dead" by the time the protecting diode rises to the defense.

The third remedy may work in some cases to protect transistors from voltage transients which are externally generated, but it is almost useless in providing protection against internally-generated transients. What is more, the use of additional transistors and a multiplicity of diodes and other circuit components to form a protective device, is a very expensive and often unreliable solution. The transistors in the protecting circuit may also need protecting, thus requiring a never-ending chain of circuitry.

Again the protective devices which have heretofore been provided may work under ordinary temperature ranges but become useless under the higher temperature ranges of critical military and similar applications; or they may become excessively expensive.

What is surely needed here is a simple inexpensive voltage-operated fuse, a protective device which becomes operative before the transistor has been destroyed, and which works over the temperature ranges encountered in all commercial and military applications, but a protective device which, unlike the usual fuse, is not itself destroyed at each application. At the same time, any protective device which must be at least in part be connected in series with the transistor must in many applications be capable of carrying large supply currents to the transistor without suffering appreciable voltage drops.

Such is the problem to which we have addressed ourselves. We provide a device which breaks down before the transistor has an opportunity to do so, and which absorbs the energy of the high-voltage pulse. This we do by providing voltage break-down and absorbing means and by placing a small time constant between the transistor and said break-down and absorbing means.

An object of our invention is to provide new and improved apparatus for protecting transistors from large voltage surges. A second object is to provide a voltage protective device for transistors which can be used both internally and externally to the circuit in which the transistors are used and are being protected. A third object is to provide a voltage protective device which operates reliably over all ambient temperature ranges presently encountered in electronic applications. A fourth object is to provide a voltage protective device for transistors which is operative over many voltage surges. A fifth object is to provide an over-voltage protective device for transistors that is extremely simple and wholly reliable in operation. A sixth object is to provide a voltage protective device that is extremely economical to produce. A seventh object is to provide a voltage protective device for transistors which is capable of carrying the relatively large direct currents required in power transistor circuits.

These and other objects will be better understood upon consideration of the following detailed description made in conjunction with the drawings, wherein.

Figure 1:
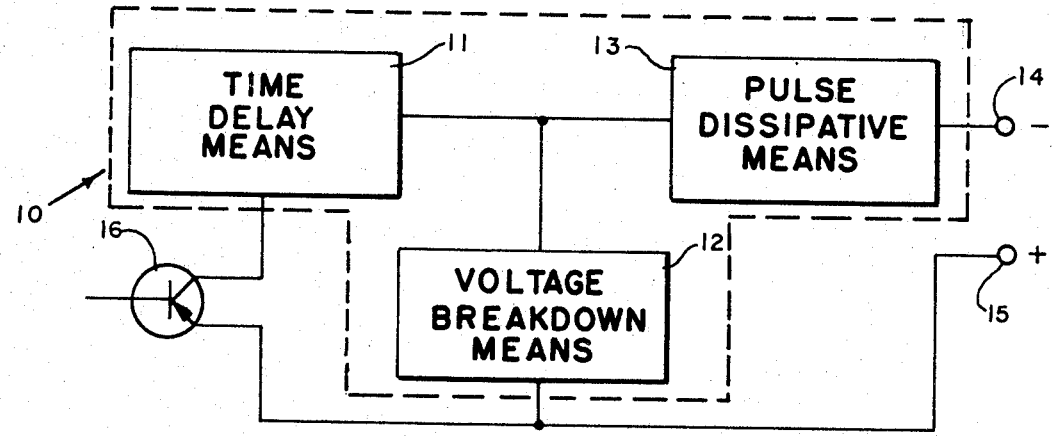
FIG. 1 is a block diagram of the device and its application.

Referring to FIG. 1 where the voltage protective device of the present invention is shown in block diagram with a typical transistor, it is seen that the device is generally comprised of three portions or means forming a three-terminal device. A time delay means 11 is provided and connected in series arrangement with the transistor 16, the pulse dissipative means 13 and the D.C. power busses 14 and 15, while a voltage break-down means 12 is shunted across the series combination of the transistor 26 and the time delay means 11. The pulse dissipating means 13 is placed between the junction of 11 and 12 and the incoming power busses 14 and 15.

Figure 2:
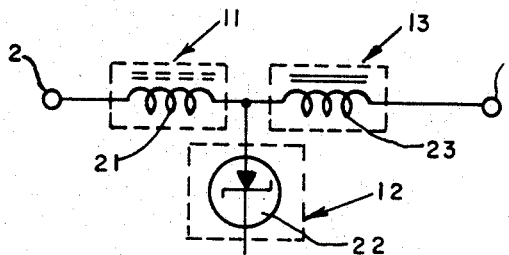
FIG. 2 is a circuit diagram of one embodiment of the device.

The device generally speaking has three terminals: an input terminal 1, FIG. 2, an output terminal 2 and a ground terminal 3. The input terminal is generally connected to the high side of the power busses, or to the circuit on the power-bus side; the output terminal is generally connected to the transistor or on the transistor side of the circuit; while the ground terminal is connected to the transistor and low side of the power busses. The characteristics of the voltage break-down means 12 are such that for a given voltage $V_{D.C.}$, as supplied by the power busses, this means will not be broken down and hence will ostensibly be non-conducting, but that for a few additional volts, it will break down, become conducting and provide a low-impedance shunt path. A chosen Zener diode 22 or any suitable solid state rectifying diode operating in the Zener mode, as shown in FIG. 2, when input voltages exceed a predetermined level, but otherwise remaining non-conducting, pretty well satisfies these requirements. Rectifying diodes of selenium, germanium and silicon are useful for this purpose.

The characteristics of the time delay means 11 are such that the greatest possible time delay in the transmission of transient electric pulses, with the least possible impedance to supply currents and signals, is provided. Generally speaking a small, high Q inductance coil 11, FIG. 2, wound from relatively large copper wire on a suitable high-frequency core meets these requirements very well.

The characteristics of the pulse dissipative means 13 are that greatest possible attenuation to and dissipation of the transient pulses, with the least drop in supply voltages, is provided. In some instances, where the current drawn by the transistor is small, a resistor of appropriate size serves this purpose; however, we prefer to use a small low-Q inductance coil which provides losses to the transient pulses but essentially no drop to the supply currents.

All three means should be as small as possible and compatible to being placed in a common inexpensive and wholly reliable housing such as that shown in FIG. 12, and as will subsequently be completely described.

Figure 6:
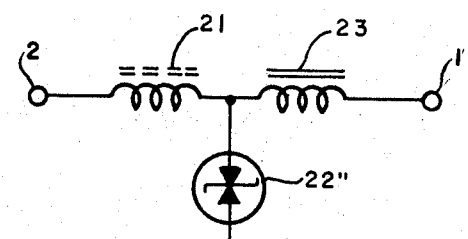
FIG. 6 is a circuit diagram of an alternative from of device.
Figure 3:
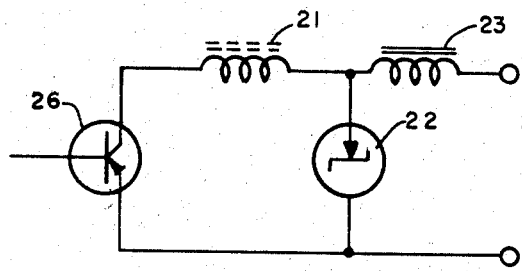
FIG. 3 is a circuit diagram of the device and its application.
Figure 4:
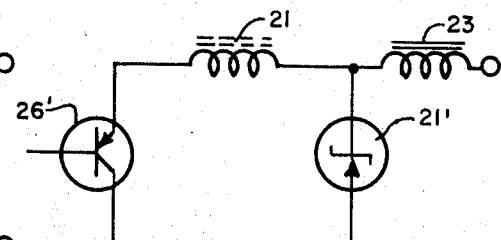
FIG. 4 is a circuit diagram of an alternative form of the device and its application.

FIGURES 3 and 4 show the detailed embodiments of our protective device 10 connected to transistors in the common emitter and common collector configurations, respectively. The only difference between the two arrangements is the polarity of the Zener diode with respect to the time-delay and pulse dissipative coils and incoming power busses. FIG. 6 shows an alternative arrangement whereby two Zener diodes 22″, connected back-to-back, are used to replace the single diode. This arrangement has the advantage that it can be used interchangeably for all transistor configurations, but the disadvantage of costing more.

Figure 5:
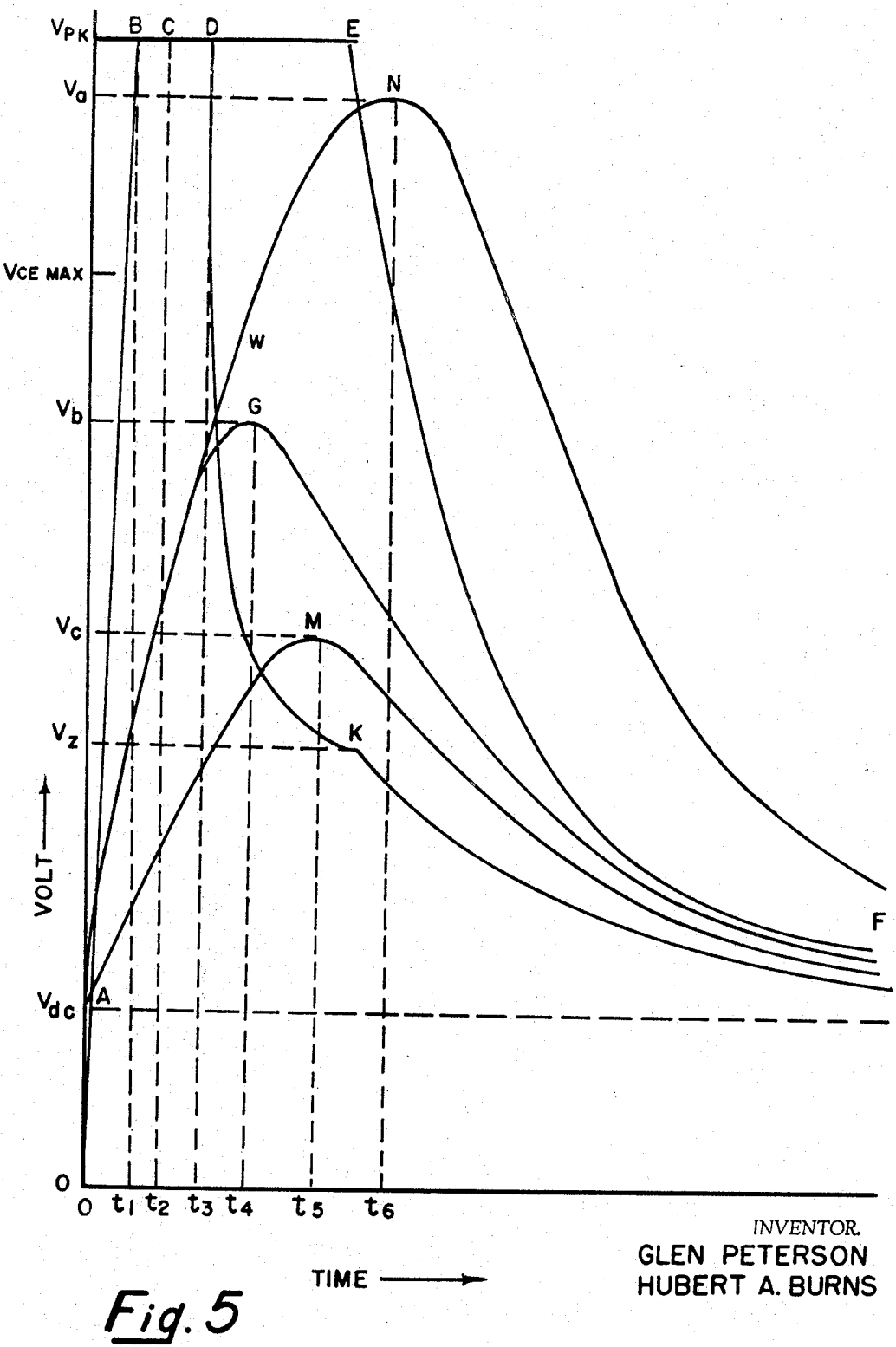
FIG. 5 is a graph which illustrates the operation of the device.

Referring to FIG. 5, the exact operation of the device will be explained. The transient pulse ABCDEF which is applied has a steeply rising wave front, a fairly broad top, and an exponential decay, and while the exact shape of the pulse is of no importance such a shape is fairly typical of the pulses encountered and is fairly lethal. At time $t_0$, the transient voltage pulse hits the incoming terminals, as 14 and 15, FIG. 1. In the absence of a protective device this pulse hits the transistor directly and rises to the peak value, $V_{pk}$, at time $t_1$ as shown. This value of peak voltage is far above $V_{CE\,max.}$, the highest voltage rating of the transistor. In a large percentage of the cases, such a voltage pulse will if it is high enough or lasts long enough, or both, break the transistor down and, either alone, or through the help of the applied $V_{DC}$, will destroy the transistor. Time $t_2$ represents the time at which the transistor breaks down, if the pulse remains at a level $V_{PK}$, and time $t_3$ is the time at which the voltage break-down means (Zener diode) breaks down, if the pulse remains at $V_{PK}$. When the Zener diode breaks down the voltage falls rapidly along the exponential curve DK to the level $V_Z$ that is maintained by the Zener diode when sufficient voltage is present and thence along KF to join the normal exponential fall-off of the pulse.

The curve AWNF represents the voltage that would be seen by the transistor if it is protected only by the combined inductance coils 21 and 23, FIG. 3. While the coils delay the rise of voltage, as expected, the voltage nevertheless rises to a peak value of $V_a$ which is greater than $V_{CE\,max.}$ and lasts nearly as long as the incident pulse. Thus, neither the Zener 22, nor the inductances 21 and 23, acting alone are sufficient to protect the transistor. The peak voltage in both instances rises above what the transistor can stand.

With the Zener diode 22 and the inductance 21 acting in combination, however, the maximum voltage seen by the transistor is $V_b$ at time $t_4$ since due to the Zener diode breaking down at $t_3$, the incident wave hitting the inductance 21 does not last long enough to get to the full inductive rise. Actually, due to the fact that the transistor 23 draws some current through the inductances 21 and 23 as the pulse is applied, and that the Zener diode 22 also draws considerable current through the inductance 23, the voltage will suffer a drop $$L\frac{di}{dt}$$

and hence actually follow the curve AMF which has a peak voltage $V_c$, less than $V_b$. Thus, it is seen that through the combined properties of the inductances and Zener diode, the manner in which these elements are placed in the circuit, with respect to the transistor and the source of transient pulses, the transistor is adequately protected at all times. This is true even when the transient pulse rises to a value several times that illustrated. The only fundamental requirement is that the inductance 21 provides a time delay considerably in excess of the time required for the Zener diode to break down.

Obviously the Zener diode must be connected in that direction which supports the applied D.C. energizing or biasing voltages, and must have a Zener or break-down voltage greater than the energizing or biasing voltages.

The illustration, FIG. 5, shows a pulse polarity which adds to the applied D.C. voltage. When a pulse of opposite polarity is incident upon the transistor and protective device, and exceeds the D.C. voltage, a potential is applied to the Zener diode in the forward direction so that it becomes conducting at considerably less voltage than in the Zener or reverse bias direction. The transistor is thereby protected in its inverse direction—usually at a much lower voltage level than in its forward direction.

Figure 7:
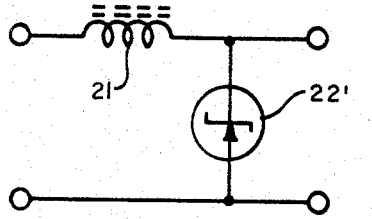
FIG. 7 is a circuit diagram of a simplified form of the device.

FIG. 7 illustrates a somewhat simplified form of protective device comprised of a time delay coil 21 and Zener diode 22'. This form of protective device serves in a great many applications and is slightly less expensive than the complete device of FIG. 2. In this form the pulse energy is essentially all dissipated in the Zener diode.

As a voltage break-down device, a selenium diode acting in the Zener region serves the purpose very well at ordinary temperature—say up to 125° C. Selenium is a multi-cellular crystalline substance which provides a sort of self-healing property. We have found that selenium diodes can be completely punctured thousands of times and still remain serviceable. Because of this property, we prefer selenium diodes when the temperature conditions are such that they can be used.

For high temperature applications, it becomes necessary to use silicon Zener diodes as the voltage breakdown device. Because a silicon diode is essentially a single crystal device, it usually cannot be completely punctured more than once. Thus, when it is necessary to use silicon Zener diodes as the voltage break-down device, it is desirable to get rid of as much of the incident pulse energy as possible before it reaches the diode. Here again the pulse dissipative coil 23 serves a useful purpose. It is designed to inductively absorb as much of the pulse energy as possible and is purposefully designed to have high inductive losses.

Figure 8:
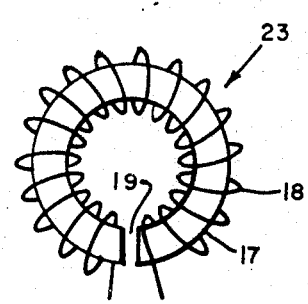
FIG. 8 is a drawing of one of the components used in the device.

In the preferred form, coil 23, FIG. 8 is wound in the form of a single layer coil 18 on a solid soft iron ring core 17 having a suitable air gap 19. The pulse energy is quickly absorbed by means of the eddy currents induced in the soft iron core. Again, one or more shorted turns of copper can also be placed around the coil 18.

The purpose of the air gap 19 is to prevent the complete magnetization of the soft iron core 17 by the D.C. which must flow through the winding 18 when the transistors of a given circuit are energized and operating.

Figure 9:
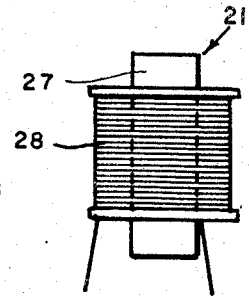
FIG. 9 is a drawing of another component used in the device.

In FIG. 9 we see the preferred form for the time delay coil 21. It is comprised of the single or multi-layer solenoidal coil 28 and the cylindrically-shaped powdered iron core 27. To provide the greatest possible time delay, the coil 21 should have a very high Q and the largest possible inductance consistent with other requirements. The time delay provided is proportional to Q; hence the greater the Q and the lower the applied frequency, the greater is the time delay provided by coil 21.

Once more the value of the input inductance 23 is seen. The dissipative inductance of this coil slows the incident pulse down and smears it out over a considerably longer time, and in effect lowers the frequencies applied to coil 21.

Figure 10:
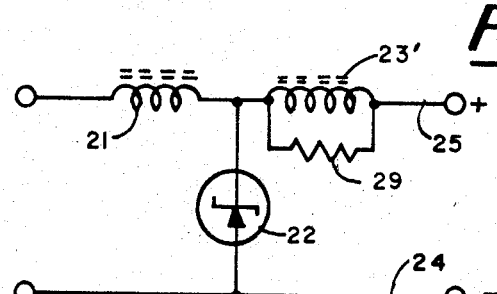
FIG. 10 is a circuit diagram of an alternative form of the device.

FIG. 10 shows an alternative means of getting dissipation in the input coil device. A high-Q coil 23 similar to 21 can be provided, and a resistor 29, of suitable size, connected in shunt with it. However, there is little merit in this alternative. The combination 23 and 29 would cost more than the simple toroidal coil 23 of FIG. 8, and would not be as effective. Moreover, if two open coils such as 21 and 23' are assembled closely together, to provide a complete and finished unit, there would be considerable inductive coupling between them, and this would greatly reduce the effectiveness of 21 in providing maximum time delay.

When 23 is wound as a toroid, as in FIG. 8, and 21 is wound as a solenoid, as in FIG. 9, there is practically no inductive coupling between them, even though they are assembled closely together.

For some applications, it may be desirable to fabricate both 21 and 23 in the form of toroids so that both are free from intercoupling as well as coupling from the outside.

Figure 12:
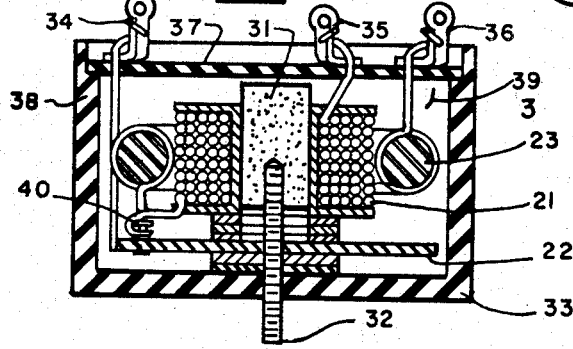
FIG. 12 is a cross-sectional drawing of the preferred embodiment of our invention.

FIG. 12 shows the preferred physical embodiment of our invention. It is simple, compact, reliable, economical and highly efficient as a protective device for transistors. The voltage break-down device, or Zener diode 22, is placed in the bottom of a molded plastic cup 33, and held in place by means of a powdered iron insert-type of core having a powdered iron body 31 and a threaded stem 32. The cup 33 has a tapped hole centered in its bottom and stem 32 is screwed into this hole through an eyelet in 22 thus holding 22 in place against the bottom of the cup. Time delay coil 21, wound on a bobbin drops snugly over a powdered iron body. The pulse dissipation coil 23, in the form of a toroid, then fits neatly around 21, as shown. Terminal wafer 37, having terminals 34, 35 and 36, rests on edge 38 of plastic cup 33, with appropriate connections made to coils 21 and 23, and Zener diode 22. Voids in the cup are then filled with suitable encapsulating materials.

In actual practice, the entire unit is assembled external to the cup, by means of suitable jigs, and then twisted into the cup afterward and encapsulated.

Figure 11:
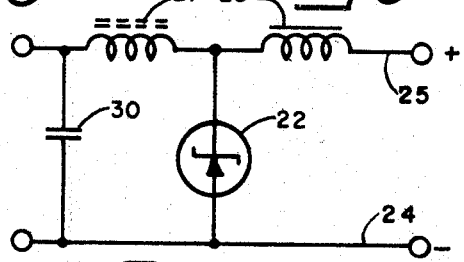
FIG. 11 is a circuit diagram of still another form of the device.

FIG. 11 illustrates a further improvement in some applications. A condenser 30 is connected between the output or transistor end of time delay coil 21 and the low potential bus 24. This causes the time delay coil to draw a larger initial current, following pulse application, than would be possible through transistor loading alone, and this helps lower the pulse voltage through the $$L\frac{di}{dt}$$

drop in coil 21, as previously mentioned. Of course most transistors have a sufficiently large output capacitance and the condenser 30 is usually unnecessary.

Figure 13:
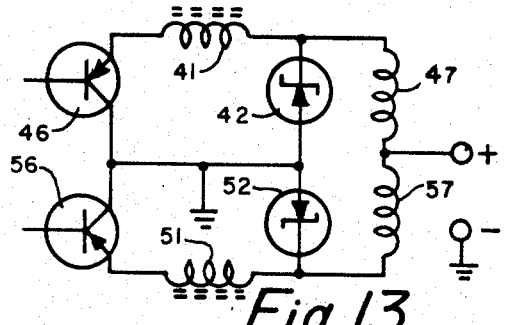
FIG. 13 is a circuit diagram illustrating one type of application of our device.

FIG. 13 illustrates specific internal applications for our transistor protective device. In those circuits where the signal frequencies are considerably lower than the time constants of the protective device, the latter can be placed near the transistors and between the transistors and normal circuit components as shown. FIGURE 13 represents a push-pull pulse amplifier, for example, having a transformer in the output circuit with primary windings 47 and 57. Due to the quick switching operation, the transformer primary windings 47 and 57 may ring and thereby produce high-voltage spikes at the crest or in the troughs, of the applied wave, which would damage the transistor emitters. To prevent this, our protective device, in the reduced form of FIG. 7 and comprised time delay coils 41 and 51, respectively, and Zener diodes 42 and 52, respectively, is placed in each emitter connection, as shown, whereby the voltage spikes generated by the transformer windings 47 and 57 do not reach the emitters of transistors 46 and 56. For all signal voltages less than the voltages of the spikes, the protective devices are inoperative and essentially unnoticed by the circuit.

Whether or not the normal transistor circuit components are transformers, resistors and/or capacitors, our over-voltage protective device can be used directly in the signal connections under those circumstances where the inductance of the time delay coil is sufficiently small as to not appreciably effect the circuit operation, and where the break-down level of the Zener diode is greater than the signal voltages normally operating in the circuit.

Figure 14:
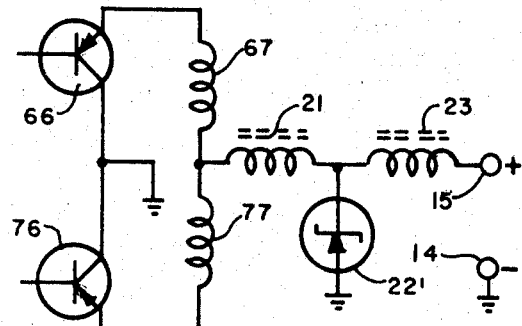
FIG. 14 is a circuit diagram illustrating another type of application of our device.

The other type of application is illustrated by FIG. 14 where our over-voltage protective device is shown connected in series with power supply bus and the transistor circuit. Our protective device is comprised of time delay coil 21, voltage breakdown Zener diode 22' and pulse dissipative coil 23. The transistor circuit is comprised of transistors 66 and 76 and transformer primaries 67 and 77.

FIG. 13 illustrates the application for internally generated voltage surges, while FIG. 14 illustrates the application for externally-generated transient pulses.

Our initial tests of our protective device were performed using very simple apparatus. Using batteries we charged 1 mf. condensers to voltages as high as 400 volts, and then to form pulses discharged these condensers through transistors, with and without protective devices. We experimented mostly with 12 volt power transistors connected to form DC to AC inverters. We found that transistors would stand only a few 400 volt pulses from the condenser, usually only one or two; whereas, with the protective device, thousands of such pulses never did damage a single transistor. Since that time we have elaborately studied this problem, using the best oscilloscopes available, and believe that we have invented and perfected one of the simplest and most reliable over-voltage protective devices, for transistors, known to man.

We claim:

1. A three-terminal voltage protective device for transistors comprised of time delay means, pulse dissipative means and voltage break-down means, said terminals identified as input, output and ground terminals, respectively, one terminal of said time delay means connected to said output terminal, a second terminal of said time delay means connected to one terminal of each of said pulse dissipative means and said voltage break-down means, a second terminal of said pulse dissipative means connected to said input terminal, a second terminal of said voltage break-down means connected to said ground terminal, said time delay means and said pulse dissipative means, in addition to said delay and dissipative functions, together providing at least one low resistance path for the conduction of direct currents between said input and output terminals.

2. A three-terminal voltage protective device for transistors, as in claim 1, having a transistor connected to said output and ground terminals and having power busses connected to said input and ground terminals.

3. A three-terminal protective device for transistors, as in claim 1, with the transistor connected to said output and ground terminals, and having associated circuit components connected to said input and ground terminals.

4. A three-terminal protective device for transistors, as in claim 1, having circuit components connected to said output and ground terminals, and having power busses connected to said input and ground terminals.

5. A three-terminal protective device for transistors, as in claim 1, with said time delay means and said pulse dissipative means comprised of inductance coils.

6. A three-terminal protective device for transistors, as in claim 1, with said voltage break-down means comprised of a solid-state rectifying diode.

7. A three-terminal protective device for transistors, as in claim 6, with said solid-state rectifying diode connected to operate in the Zener region when applied voltages exceed a predetermined level.

8. A three-terminal protective device for transistors, as in claim 1, with said voltage break-down means comprised of two solid-state rectifying diodes connected in a series back-to-back relationship.

9. A three-terminal protective device for transistors, as in claim 1, with said time delay means comprised of a high-Q inductance coil and with said dissipative means comprised of a low-Q inductance coil.

10. A three-terminal protective device for transistors, as in claim 1, with said time delay means comprised of a high-Q inductance, with said voltage break-down means comprised of a solid state rectifying diode, and with said pulse dissipating means replaced with a short-circuit and the pulse dissipating functions of said pulse dissipating means encorporated into said voltage break-down means.

11. A three-terminal protective device for transistors, as in claim 1, with said time delay means comprised of an inductance coil, with said dissipative means comprised of an inductance coil, with said dissipative means comprised of a resistance, and with said voltage break-down means comprised of a solid state rectifying diode.

12. A three-terminal protective-device for transistors, as in claim 1, with said time delay means comprised of an inductance coil, with said dissipative means comprised of an inductance coil and a resistance connected in parallel, and with said voltage break-down means comprised of a solid state rectifying diode.

13. A three-terminal protective device for transistors, as in claim 5, with a capacity connected between said output and ground terminals.

14. A three-terminal protective device for transistors, as in claim 9, with said high-Q inductance coil comprised of a solenoid type winding around a powdered iron core, and with said low-Q inductance coil comprised of a toroid wound about a solid-soft-iron ring core which is provided with an air gap.

15. A three-terminal protective device for transistors, as in claim 14, said toroid having a shorted turn in the form of a copper sleeve.

16. An assembly comprised of a cup, a solid state rectifying means, a terminal wafer, a mass of insulating material, a solenoidal inductance coil, on a powdered iron core having a threaded insert on one end, surrounded by a toroid on a solid soft-iron ring core having a gap, said threaded insert passing through an eyelet in said solid state rectifying means, said solid state rectifying means being in the form of a thin wafer, said threaded insert threading into the bottom of said cup after passing through said eyelet, said coils and solid state rectifying means being entirely within said cup, said terminal wafer resting on an edge at the top of said cup, said terminal wafer being provided with an input terminal, an output terminal and a ground terminal, one terminal of said solenoidal coil connected to said output terminal, a second terminal of said solenoidal coil connected to one terminal of said toroid and to one terminal of said solid state rectifying means, a second terminal of said toroid connected to said input terminal, a second terminal of said solid state rectifying means connected to said ground terminal, said mass of insulating material impregnating and encapsulating the entire contents of said cup.

References Cited

UNITED STATES PATENTS

| | | | |
|---|---|---|---|
| 1,211,822 | 1/1917 | Chernyshoff | 317—61 X |
| 1,816,838 | 8/1931 | Gay | 317—61.5 |
| 1,865,409 | 6/1932 | Boehne | 317—61.5 |
| 2,338,405 | 1/1944 | Cash et al. | 317—61 |
| 2,571,027 | 10/1951 | Garner | 315—91 |
| 2,575,232 | 11/1951 | Parker et al. | 315—91 |
| 2,789,254 | 4/1957 | Bodle et al. | 317—61 |
| 2,815,445 | 12/1957 | Young et al. | 315—91 X |
| 2,815,446 | 12/1957 | Coombs | 315—91 X |
| 2,845,529 | 7/1958 | Weldon | 317—61 X |
| 3,049,646 | 8/1962 | Cox | 317—99 |
| 3,052,820 | 9/1962 | Kreekon et al. | 317—99 |

ARTHUR GAUSS, *Primary Examiner.*

JOHN W. HUCKERT, *Examiner.*

J. JORDAN, *Assistant Examiner.*